July 24, 1923. 1,463,137
S. MAKEPEACE
ROLLER COASTER
Filed Aug. 8, 1922 2 Sheets-Sheet 1

Inventor
Stanley Makepeace

By F. H. Bryant
Attorney

July 24, 1923.
S. MAKEPEACE
ROLLER COASTER
Filed Aug. 8, 1922  2 Sheets-Sheet 2
1,463,137
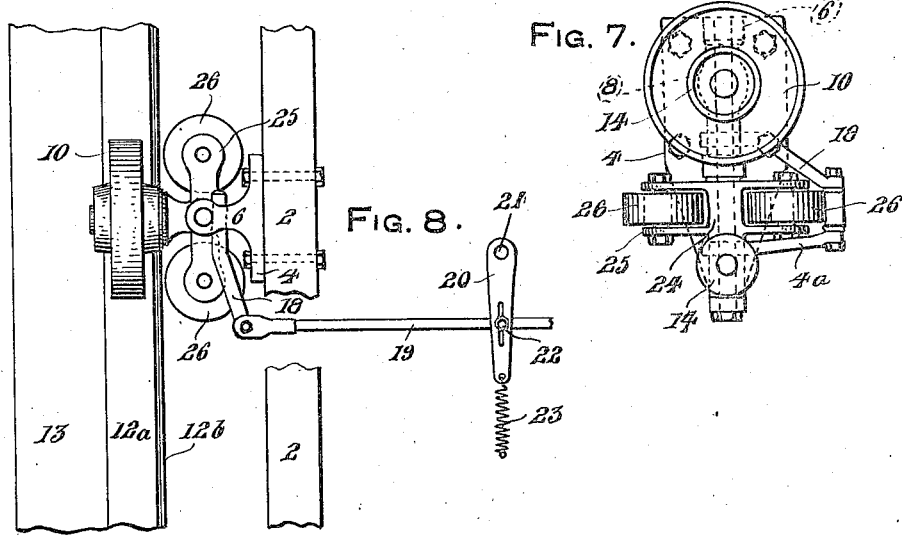
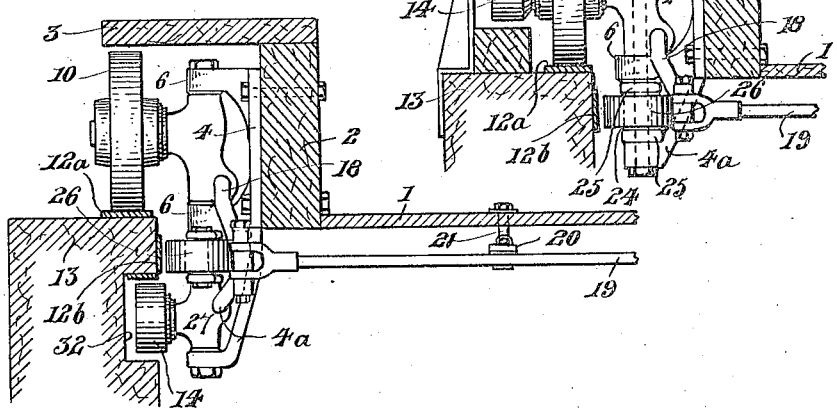
Inventor
Stanley Makepeace
By  J. K. Bryant
Attorney Patented July 24, 1923.

1,463,137

UNITED STATES PATENT OFFICE.

STANLEY MAKEPEACE, OF MILWAUKEE, WISCONSIN, ASSIGNOR TO CASTALIA GARDENS, INC., OF MILWAUKEE, WISCONSIN, A CORPORATION OF WISCONSIN.

ROLLER COASTER.

Application filed August 8, 1922. Serial No. 580,427.

*To all whom it may concern:*

Be it known that I, STANLEY MAKEPEACE, a citizen of the United States of America, residing at Milwaukee, in the county of Milwaukee and State of Wisconsin, have invented certain new and useful Improvements in Roller Coasters, of which the following is a specification.

This invention relates to certain new and useful improvements in roller coasters and has for its primary object to provide pivoted knuckle bearings for the stub axles of the car wheels with a connecting rod between the pivoted knuckles permitting lateral movement and substantially horizontal pivotal movement of the car body relative to the mounting wheels in rounding curves in the track structure and also in traveling over a straightway track.

The invention further provides for a safety attachment for the roller coaster in the form of guard roller associated with each car supporting wheel and moving adjacent a combined auxiliary guard and track structure and being capable of supporting the car should damage result in the main car supporting wheels.

Another object of the invention is to provide laterally positioned anti-friction rollers carried by a frame that is connected to the pivoted or steering knuckle for each car supporting wheel, the anti-friction rollers being disposed for engagement with the inner face of the track rail for properly positioning the car supporting wheels upon the upper running surface of the track.

A still further object of the invention is to provide a resilient or self-centering mounting for the connecting rod of the steering knuckle operating in conjunction with the anti-friction rollers for properly positioning the car supporting wheels upon the running surface of the track.

With the above general objects in view and others that will appear as the nature of the invention is better understood, the same consists of the novel form, combination and arrangement of parts hereinafter more fully described, shown in the accompanying drawings and claimed.

Figure 1:
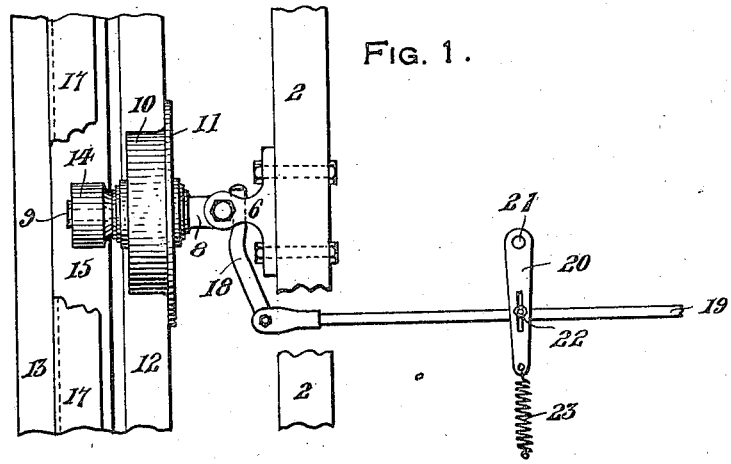
Figure 2:
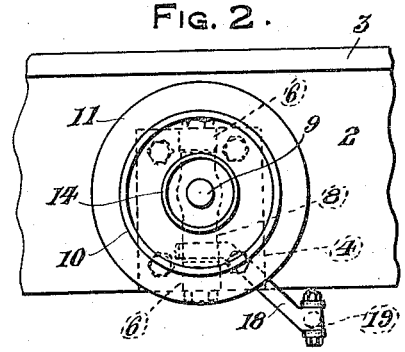
Figure 3:
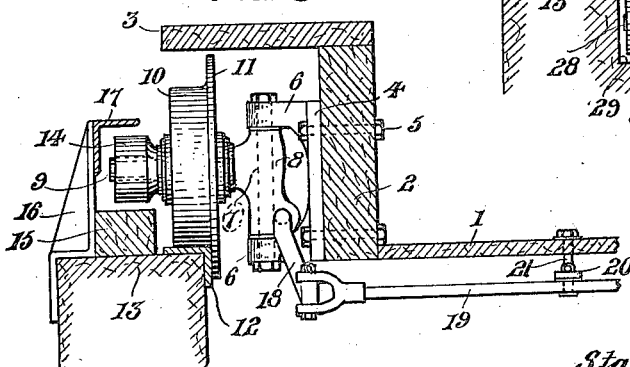
Figure 5:
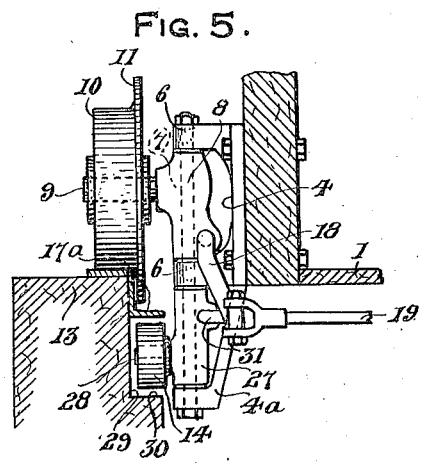

In the drawings, wherein like reference characters designate corresponding parts throughout the several views, Figure 1 is a fragmentary top plan view, partly broken away showing the side rail of a roller coaster car provided with a steering knuckle carrying a supporting wheel and a resiliently mounted connecting rod between the supporting wheels and the side of the car body, and further showing a portion of the tracks for the supporting wheels with the guard roller mounted upon the wheel axle and associated with a guard rail adjacent said track, Figure 2 is a fragmentary side elevational view of the car body with the supporting wheel and guard roller carried thereby, Fig 3 is a cross sectional view of a portion of the car and track shown in Fig. 1, showing the steering knuckles carried by the car body supporting the wheels and guard roller, Figure 4 is a cross sectional view, similar to Fig. 3 showing a modified form of the invention wherein anti-friction rollers are carried by a frame mounted upon the rod supporting the steering knuckle and adapted for engagement with the adjacent side face of the tracks for properly positioning the car supporting wheels relative to said track, Figure 5 is a fragmentary cross sectional view showing another modified form of the invention wherein the guard roller is carried by a steering knuckle disposed beneath and mounted upon the post supporting the steering knuckle for the supporting wheel, Figure 6 is a fragmentary cross sectional view similar to Fig. 5 showing the anti-friction rollers associated with the post supporting the two steering knuckles for the car supporting wheels and guard rollers, Figure 7 is a front elevational view of the wheel and guard roller mounting for the car shown in Fig. 6, and Figure 8 is a fragmentary top plan view, similar to Fig. 1 showing the anti-friction rollers associated with the wheel and guard roller mounting shown in Figs. 6 and 7.

Heretofore, it has been customary in pleasure railways of the roller coaster type to provide rigid mounting for the car supporting wheels, thereby preventing any substantial movement of the roller coaster car relative to the track structure with which the same is associated. By providing a resilient stub axle mounting for roller coaster cars, the car bodies are permitted substantially free cushioned movements relative to the wheel mountings and axles therefor increasing the pleasure of riding and offering sensation hitherto impossible with a rigid mounting for the supporting wheel structure. Also, the provision of the resiliently mounted connecting rod for the steering knuckles supporting the wheel axles at each side of the car body provide for the proper positioning of the supporting wheels in rounding curves and the like, the anti-friction rollers associated with the steering knuckles further insuring the correct positioning of the supporting wheels upon the track structure.

Referring more in detail to the accompanying drawings, and particularly to Figs. 1 to 3 there is illustrated a roller coaster car and track structure with which the same is associated, the car embodying a bottom wall 1, a side wall 2 and an outwardly directed upper rail or wall 3 shown more clearly in Fig. 3. The wheel mountings for the car body embody steering knuckles and stub axles carried thereby, the mounting for the steering knuckle including a plate 4 bolted as at 5 to the side wall 2 of the car and carrying outwardly directed upper and lower bracket arms 6 for supporting a perpendicular post 7 upon which the steering knuckle 8 is journaled. The stub axle 9 carried by the steering knuckle 8 supports a track wheel 10 provided with the usual flange 11, the track wheels running over a corner angle iron 12 supported at the inner upper edge of the rail 13.
A guard roller 14 is carried by the outer end of each stub axle 9 as illustrated, and is slightly spaced above the super rail 15 mounted upon the upper face of the track rail 13, brackets 16 carried by the track rail 13 supporting angle iron guide rails 17 having one flange thereof overlying the guard roller 14 as clearly shown in Figs. 1 and 3.

The steering knuckles 8 at opposite sides of the car body each carry a link 18 that is pivotally mounted to the adjacent end of a connecting rod 19 extending transversely of and beneath the bottom wall 1 of the car body, a lever 20 pivotally mounted upon the pin 21 depending from the bottom wall of the car body having a pin and slot connection 22 with the connecting rod 19, while the free end of the lever 20 is resiliently connected as at 23 to the bottom 1 of the car for the purpose of centering the connecting rod 19 and properly positioning the wheels 10 upon the track rails 13. From the above detail description of the device, it is believed that the construction and operation of the device as shown in Figs. 1 to 3 will at once be understood, it being noted that the flanges 11 carried by the track wheels 10 in rounding a curve of the track rail 13, the steering knuckles 8 will move on their pivot posts 7 to compensate for the curvature in the track structure, and against the tension of the spring mounting for the connecting rod 19, said spring mounting restoring the track wheels 10 to their proper straight line running position when the wheels reach a straight section of the track structure. The guard rollers 14 being positioned above the super rails 15 and beneath the flanges of the angle iron guides 17 operate to prevent upward movement of the roller coaster cars in attempting to jump the track structure, while said guard rollers are adapted for riding upon the super rail 15 should injury result to any of the car supporting wheels 10.
In the form of the invention shown in Fig. 4, the post 7 upon which the steering knuckle 8 is journaled extends below the lower bracket arm 6 and is secured at its lower end in the depending extension bracket arm 4ª carried by the bracket plate 4 as clearly illustrated. A frame structure 24 is loosely journaled on the lower end of the post 7 between the lower bracket arm and the bracket arm extension 4ª, the same being bifurcated at each end as at 25 rotatably supporting an anti-friction roller 26, the rollers 26 being positioned for engagement with the inner face of the track rail 13. The side friction wheels 26 operate in connection with the resiliently mounted connecting rod 19 for compelling the track wheels 10 to travel in their proper positions relative to the track rail 13, it being noted that in this form of the invention the wheel 10 is unprovided with the side flange 11, the wheel rolling over a track strip 12ª while a side strip 12ᵇ is carried by the inner face of the track rail 13 to be engaged by the anti-friction rollers 26.

Another form of the invention is shown in Fig. 5 wherein the guard roller 14 is disposed inwardly of the track rail 13 and beneath the supporting wheels 10, the bracket arm extension 4ª of the bracket plate 4 having the post 7 secured therein while a separate steering knuckle 27 is journaled upon the post 7 between the lower bracket arm 6 and the lower end of the bracket arm extension 4ª, the steering knuckle 27 carrying a stub axle 28 upon which the roller 14 is journaled. The inner face of the track rail 13 is cut away as at 29 to provide a channel for the reception of the guard roller 14, the bottom wall 30 of the cutaway portion or channel operating as a supporting rail for the guard roller 14 should injury occur to the supporting wheel 10. An angle guard rail 17ª is secured to the inner face of the cutaway portion 29 of the track rail and has one flange thereof overlying the roller 14 and cooperating with the auxiliary track surface 30 to limit upward movement of the wheel mounting for the car relative to the main track rail 13. The steering knuckle 8 supporting the track wheel 10 has the link connection 18 with the connecting rod 19, while a link 31 connects the lower steering knuckle 27 supporting the guard roller 14 to the connecting rod 19 to effect simultaneous operation of the two steering knuckles 8 and 27 for shifting the track wheel 10 and guard roller 14 during the rounding of a curve.

A still further form of the invention is shown in Figs. 6 to 8, wherein the track rail 13 is provided with the longitudinally extending groove 32 in the inner face thereof for receiving the guard roller 14 carried by the lower steering knuckle 27, a frame structure 24 bifurcated at opposite ends thereof as at 25 for rotatably supporting the anti-friction rollers 26 being journaled on the post 7 intermediate the lower bracket arm 6 and the depending bracket arm extension 4ª.

The construction and operation of the different forms of invention above described, should at once be understood, it being noted that one of the main features of the invention resides in the movable mounting of the supporting wheel and guard rollers relative to the car structure permitting free movement of the wheels and guard rollers relative to the car structure in moving over the tracks. This particular mounting permitting relative movement between the car structure and the supporting wheels will give unusual sensations during the operation of the device, as contrasted with the heretofore rigidly mounted supporting wheels for the car. The guard rollers and anti-friction wheels also being movable with the main supporting wheels insure the proper positioning of the supporting wheels at all times, especially during the rounding of a curve and entering a straight line track section.

While there are herein shown and described the preferred embodiments of the present invention, it is nevertheless to be understood that minor changes may be made therein without departing from the spirit and scope of the invention as claimed.

What I claim as new is:—

1. In a roller coaster car and track structure, a car having bracket mountings at opposite sides thereof, stub axle steering knuckles journalled in the bracket mountings, supporting wheels upon the stub axles, guard rollers associated with the supporting wheels, track rails supporting the wheels, and resiliently mounted means connecting the steering knuckles at opposite sides of the car to cause the supporting wheels to follow the track rail and permit movement of the car relative to the supporting wheels.

2. In a roller coaster car and track structure, a car having bracket mountings at opposite sides thereof, stub axle steering knuckles journalled in the bracket mountings, supporting wheels upon the stub axles, guard rollers associated with the supporting wheels, track rails supporting the wheels, anti-friction rollers carried by the bracket mountings and associated with the track rails, and resiliently mounted means connecting the steering knuckles at opposite sides of the car to cause the supporting wheels to follow the track rail and permit movement of the car relative to the supporting wheels.

3. In a roller coaster car and track structure, a car having bracket mountings at opposite sides thereof, stub axle steering knuckles journalled in the bracket mountings, supporting wheels upon the stub axles, guard rollers associated with the supporting wheels, track rails supporting the wheels, a link arm carried by each steering knuckle, and a resiliently mounted self-centering connecting rod attached to said links to cause the supporting wheels to follow the track rail and permit movement of the car relative to the supporting wheels.

4. In a roller coaster car and track structure, a car having bracket mountings at opposite sides thereof, stub axle steering knuckles journalled in the bracket mountings, supporting wheels upon the stub axles, guard rollers associated with the supporting wheels, track rails supporting the wheels, anti-friction rollers carried by the bracket mountings and associated with the track rails, a link arm carried by each steering knuckle and a resiliently mounted self-centering connecting rod attached to said links to cause the supporting wheels to follow the track rail and permit movement of the car relative to the supporting wheel.

5. In a roller coaster car and track structure, a car having bracket mountings at opposite sides thereof, vertically alined stub axle steering knuckles carried by each mounting, a supporting wheel mounted on one axle, a guard roller mounted on the other axle, and track rails with which the supporting wheels engage and being constructed for cooperation with the guard rollers.

6. In a roller coaster car and track structure, a car having bracket mountings at opposite sides thereof, vertically alined stub axle steering knuckles carried by each mounting, a supporting wheel mounted on one axle, a guard roller mounted on the other axle, track rails with which the supporting wheels engage and being constructed for cooperation with the guard rollers, and a resiliently mounted and self-centering connecting rod for the steering knuckles at opposite sides of the car.

In testimony whereof I affix my signature.

STANLEY MAKEPEACE.